(No Model.) 2 Sheets—Sheet 1.
G. W. ENGEL & W. C. JURAM.
CAR FENDER.
No. 531,026. Patented Dec. 18, 1894.
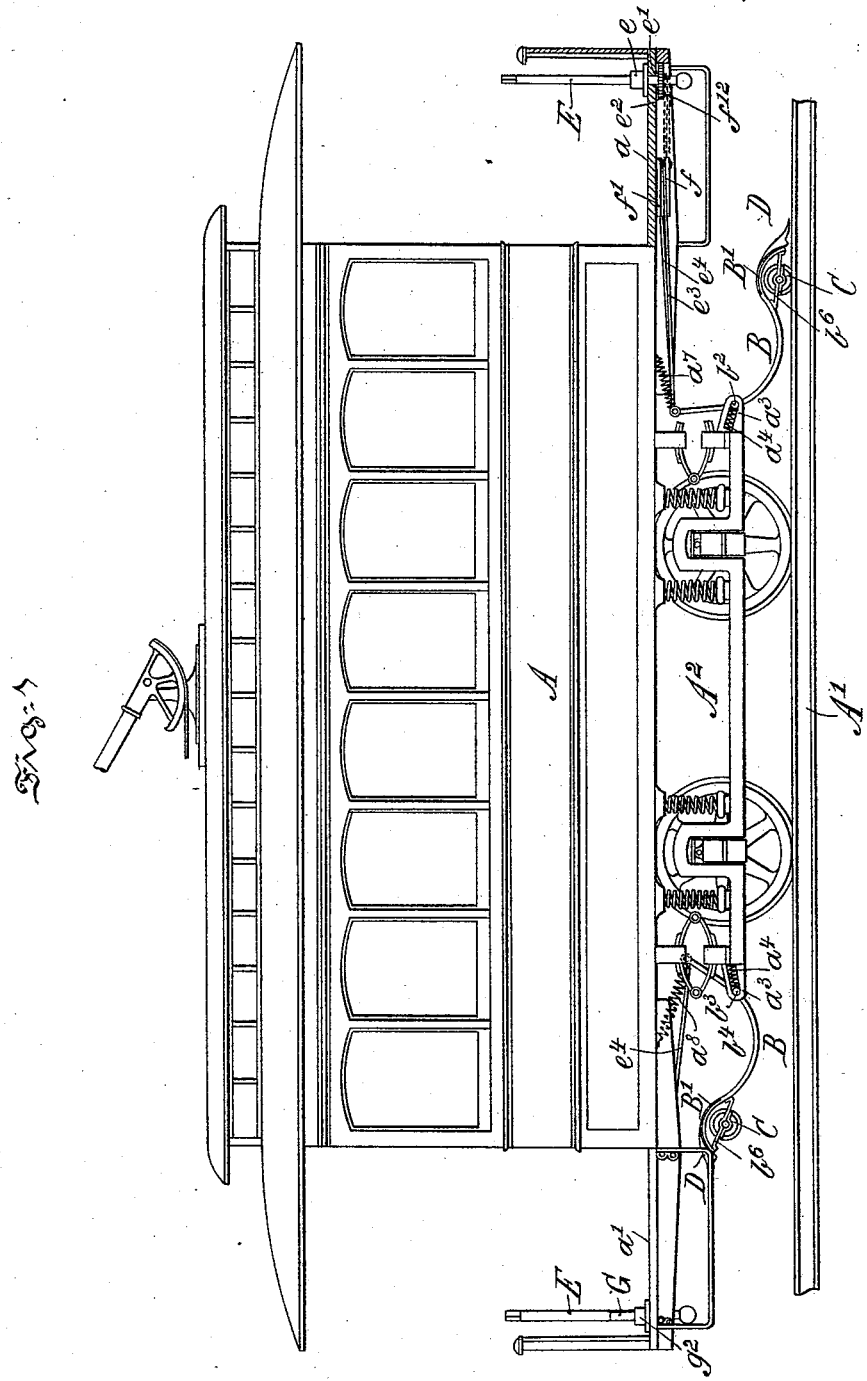
Witnesses:
Thomas M. Smith.
Richard C. Maxwell.
Inventors.
George W. Engel and W. C. Juram,
By J. Walter Douglass.
Attorney.

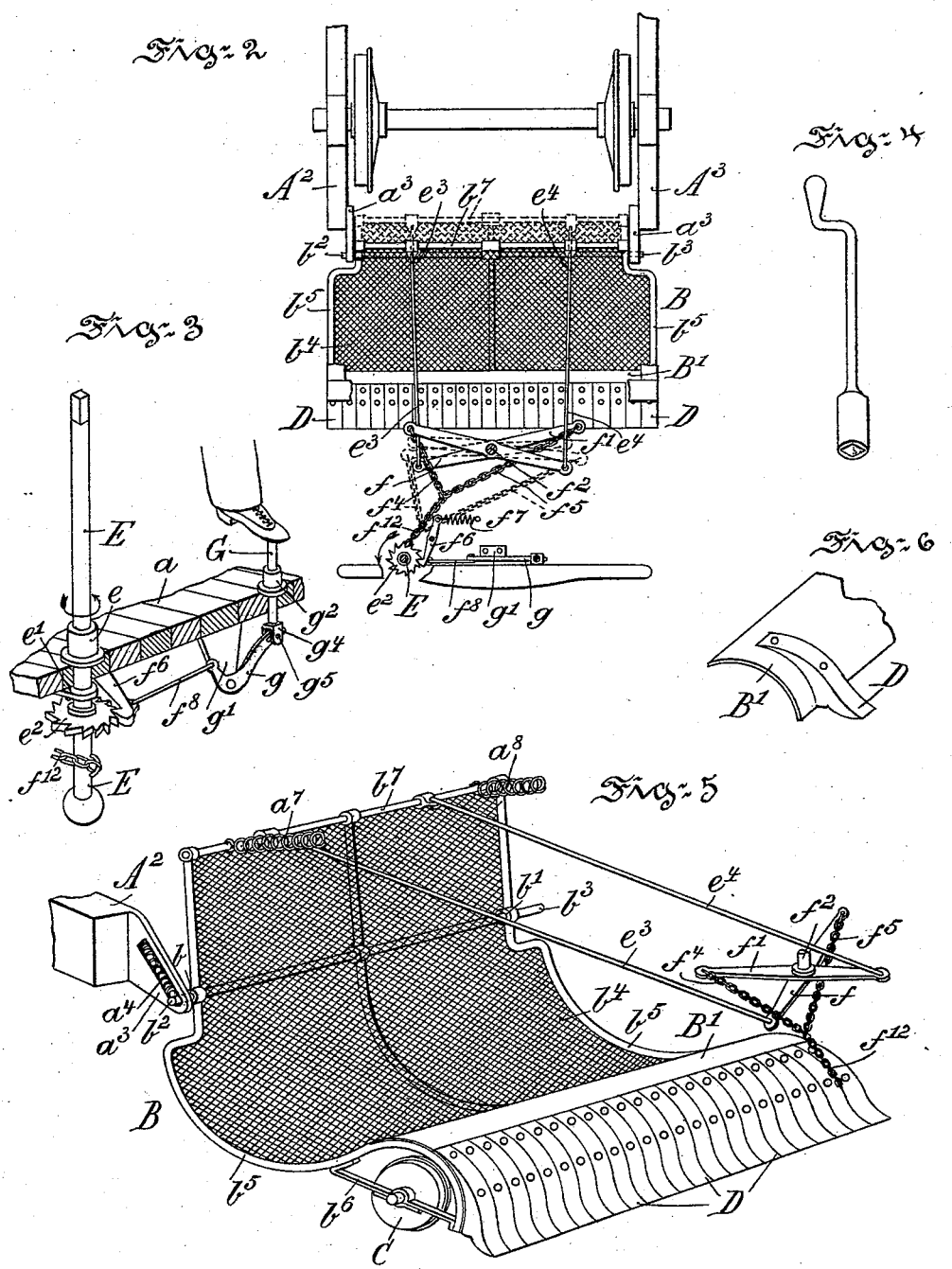

UNITED STATES PATENT OFFICE.

GEORGE W. ENGEL AND WILLIAM C. JURAM, OF PHILADELPHIA, PENNSYLVANIA.

CAR-FENDER.

SPECIFICATION forming part of Letters Patent No. 531,026, dated December 18, 1894.

Application filed September 11, 1894. Serial No. 522,706. (No model.)

*To all whom it may concern:*

Be it known that we, GEORGE W. ENGEL and WILLIAM C. JURAM, citizens of the United States, residing at the city of Philadelphia, in the county of Philadelphia and State of Pennsylvania, have jointly invented certain new and useful Improvements in Car-Fenders, of which the following is a specification.

Our invention has relation to fenders for trolley or other railway cars; and in such connection it relates more particularly to the general construction and arrangement of such an appliance.

The principal objects of our invention are, first, to provide a simple, durable and effective fender or life guard for a trolley or other railway car; second, to provide a fender or guard for a car adapted to be elevated under spring tension by means of a lever and of being automatically caused to assume a lowered position for permitting an object brought in the path thereof being gathered or carried into the apron or couch of the fender, without fear of bruising or maiming the person, and, third, to provide a fender located under the car and pivotally supported under spring tension to brackets or hangers and the fender operated by a lever to elevate the same and means adapted to release the fender from such position so that it may assume a position close to the rails of the roadbed to permit of an object being safely carried into the apron or couch of the fender or life-guard.

Our invention consists of a car fender for trolley and other railway cars constructed and arranged for operation in substantially the manner hereinafter described and claimed.

The nature, objects and scope of our invention will be more fully understood from the following description taken in connection with the accompanying drawings forming part thereof, and in which—

Figure 1, is a side elevational view of a trolley car with our fender shown in application thereto and the fender located beneath the car in rear of one platform being shown in an elevated position and beneath the car in rear of the opposite platform occupying a lowered position close to the rails of the roadbed for gathering an object into the apron or couch thereof. Fig. 2, is a plan view of the mechanism for elevating and releasing the fender so that it may assume its normal or lowered position. Fig. 3, is a perspective view of a broken section of one of the platforms of the car provided with an operating lever for elevating the fender and also means for automatically releasing the same from its elevated locked position. Fig. 4, is a similar view of a handle adapted to engage the operating lever for controlling certain mechanism of the fender adapted to permit of the elevation of the same. Fig. 5, is a perspective view of the fender, showing the apron or couch thereof, the manner of pivotally supporting the same under spring tension to the truck-frames of the car and also showing certain of the parts of the elevating and lowering mechanism; and Fig. 6, is a similar view of a portion of the arched shield surrounding traction wheels of the fender at the front thereof and slanting fingers or strips applied thereto and projecting at an angle therefrom and serving as the catcher of the appliance, whereby an object brought into the path of the same may be safely lifted over said shield into the apron or couch of the fender.

Referring to the drawings, A, is a trolley car of any ordinary construction, provided with front and rear platforms $a$ and $a'$.

$A'$, are the tracks or rails of the road-bed and along which the car is adapted to be propelled or travel electrically or otherwise.

$a^3$, are slotted hangers or brackets secured to each side of the front and rear truck-frames $A^2$ and $A^3$, of the car and provided with coiled springs $a^4$, which are seated therein and engage end journals of a fender B.

The fender is recessed at the rear upward portion thereof at $b$ and $b'$, and from which extend laterally the said journals $b^2$ and $b^3$, entering the slotted hangers or brackets $a^3$, and engaged by the said spiral or coiled springs $a^4$. The lower and front portions of the fender B, are curved downward and outward to form a couch or apron $b^4$, consisting of wire netting, flexible or woven material and engaging a skeleton frame or body $b^5$, covered with rubber or other yielding material, as clearly shown in Fig. 5, and so that an object cast in the operation of the fender into the couch or apron will not in turning or revolving therein be bruised or maimed in any manner thereby.

The front of the fender B, is provided with an arched shield B′, spanning end traction wheels C, journaled to a cross-strip $b^6$, secured to the fender frame $b^5$, and the under side of the shield B′. This arched shield is provided with a series of front projecting fingers or slanting strips D, as clearly illustrated in Figs. 5 and 6, made of wood, rubber or other yielding material to constitute a catcher and so that when an object is brought in the path of the same it will be lifted by the said fingers or strips D, and over the exterior surface of the shield B′, into the apron or couch $b^4$, and safely supported therein free from the wheels of the car, as well as the truck-frame thereof.

$a^7$ and $a^8$, are spiral or other suitable springs secured at one of their ends to the rear frame of the fender B, and at their opposite ends to the under side or bottom of the car A, as clearly shown in Fig. 1, for aiding in the return of the fender from its elevated position to its normal or lowered position close to the rails of the road-bed and as will be hereinafter more fully explained.

E, is an operating lever extending downward through a bearing $e$, mounted on each platform of the car and also a bearing $e′$, secured to the under side or bottom thereof. This lever is provided with a ratchet-wheel $e^2$, rigidly secured thereto.

$e^3$ and $e^4$, are two rods or arms connected with the rear end $b^7$, of the fender B, and at the opposite end to oscillating cross-levers $f$ and $f′$, pivoted at $f^2$, to the under side of each of the platforms of the car A.

$f^4$ and $f^5$, are chains connected with one of the extremities of said cross-levers $f$ and $f′$, merging into a single chain $f^{12}$, engaging with the lower portion of the operating lever E, as clearly illustrated in Figs. 1 and 3.

$f^6$, is a pawl-lever pivoted to the bottom of each platform and having a spring $f^7$, in engagement therewith at one end and at the opposite end with the bottom of each platform. The pawl-lever $f^6$, is arranged so as to normally engage the ratchet-wheel $e^2$, of the operating lever E. This pawl-lever $f^6$, has pivoted thereto a link $f^8$, which is connected with a bell-crank lever $g$, pivoted to a hanger $g′$, which is secured to the under side of the car beneath each platform thereof.

G, is a foot operating lever or rod extending through a bearing $g^2$, secured to the platform of the car and having at the lower end thereof a divided bearing $g^4$, forming by means of a pivot $g^5$, a movable connection with the rear end of the bell-crank lever $g$, for withdrawing by the depression of the foot operating lever G, the pawl-lever $f^6$, from its engagement with the ratchet wheel $e^2$. Upon the release of the foot from said lever G, the pawl-lever $f^6$, is again caused to engage a tooth of the ratchet wheel $e^2$, on the hand operating lever E, so as to permit of the elevating of the fender B, by winding the chain $f^{12}$, onto said operating lever E, until the fender has assumed the position illustrated to the left in Fig. 1, of the drawings.

The mode of operation of the fender of our invention is, as follows:—The fender B, being caused to assume its lowered position as illustrated to the right in Fig. 1, by then turning the hand operating lever E, in the direction indicated by the arrow in Fig. 3, the chain $f^{12}$, will be wound on the lower portion thereof, which will cause the fender to assume the position indicated at the left in Fig. 1, with the spiral or coiled springs $a^4$, compressed in the slotted hangers or brackets $a^3$, and the springs $a^7$ and $a^8$, distended and at the same time the pawl-lever $f^6$, will normally engage the ratchet-wheel $e^2$, under the tension of the spring $f^7$, and thus hold the fender in said elevated position until by a downward pressure exerted on the foot operating lever G, the pawl-lever $f^6$, by means of the link $f^8$, and bell crank lever $g$, is released from the ratchet-wheel $e^2$, whereby the hand operating lever E, rotating in an opposite direction to that indicated by the arrow in Fig. 3, will cause a release of the chain $f^{12}$, therefrom controlling the oscillating levers $f$ and $f′$, and their accessories so as to return automatically the fender B, to its lowered position, as indicated at the right in Fig. 1, with the wheels C, thereof in engagement with the rails of the road-bed. These wheels tend to steady the appliance and at the same time to support the apron or couch $b^4$, a proper distance above the road-bed, so that when an object is carried into the same it will be protected thereby from the wheels of the car as well as the bed of the road and hence safely carried therein.

It may be manifestly obvious that as to minor details, modifications may be made in certain of the parts for operating the fender without departing from the spirit of our invention.

Having thus described the nature and objects of our invention, what we claim as new, and desire to secure by Letters Patent, is—

1. The combination with a car, of a fender having an apron or couch journaled to slotted hangers or brackets provided with springs, said apron or couch provided with a shield and catcher, an operating lever and intermediate mechanism for elevating said fender and a lever and pawl-and-ratchet connection between said levers for permitting of the lowering of the same, substantially as and for the purposes set forth.

2. The combination with a car, of a fender provided with an apron or couch having a frame provided with journals held in slotted spring hangers, said frame having an arched shield with wheels and slanting fingers or strips and means for elevating said fender and returning the same to its normal position, substantially as and for the purposes set forth.

3. The combination with a car, of a fender provided with an apron or couch journaled to brackets and having shielded wheels and a slanting catcher, hand and foot operating levers and mechanism for controlling the elevation and automatic return of the fender to its lowered position, substantially as and for the purposes set forth.

4. The combination with a car, of a fender located beneath the same in rear of each platform and journaled to slotted hangers provided with springs, said fender having an arched shield with projecting fingers or strips and wheels and means for manually elevating and automatically returning the same to its normal position, substantially as and for the purposes set forth.

5. The combination with a car, of a fender provided with a recessed and curved apron or couch having journals held in slotted hangers provided with springs, the apron or couch having a front arched shield mounted on wheels and slanting fingers or strips and means for manually elevating and returning the fender to its lowered position, substantially as and for the purposes set forth.

6. The combination with a car, of a fender journaled to slotted hangers and held under spring tension therein, said fender having a shield mounted on wheels and provided with a yielding front catcher, hand and foot levers connected with each other by a spring controlled pawl-and-ratchet connection and means connected with said fender and one of said levers to permit of the elevating and lowering of the same, substantially as and for the purposes set forth.

In testimony whereof we have hereunto set our signatures in the presence of two subscribing witnesses.

GEO. W. ENGEL.
WILLIAM C. JURAM.

Witnesses:
THOMAS M. SMITH,
RICHARD C. MAXWELL.